June 3, 1924.
R. G. KNIGHT
1,496,548
BRAKE MECHANISM FOR DEPOT TRUCKS
Filed March 5, 1923   2 Sheets-Sheet 1
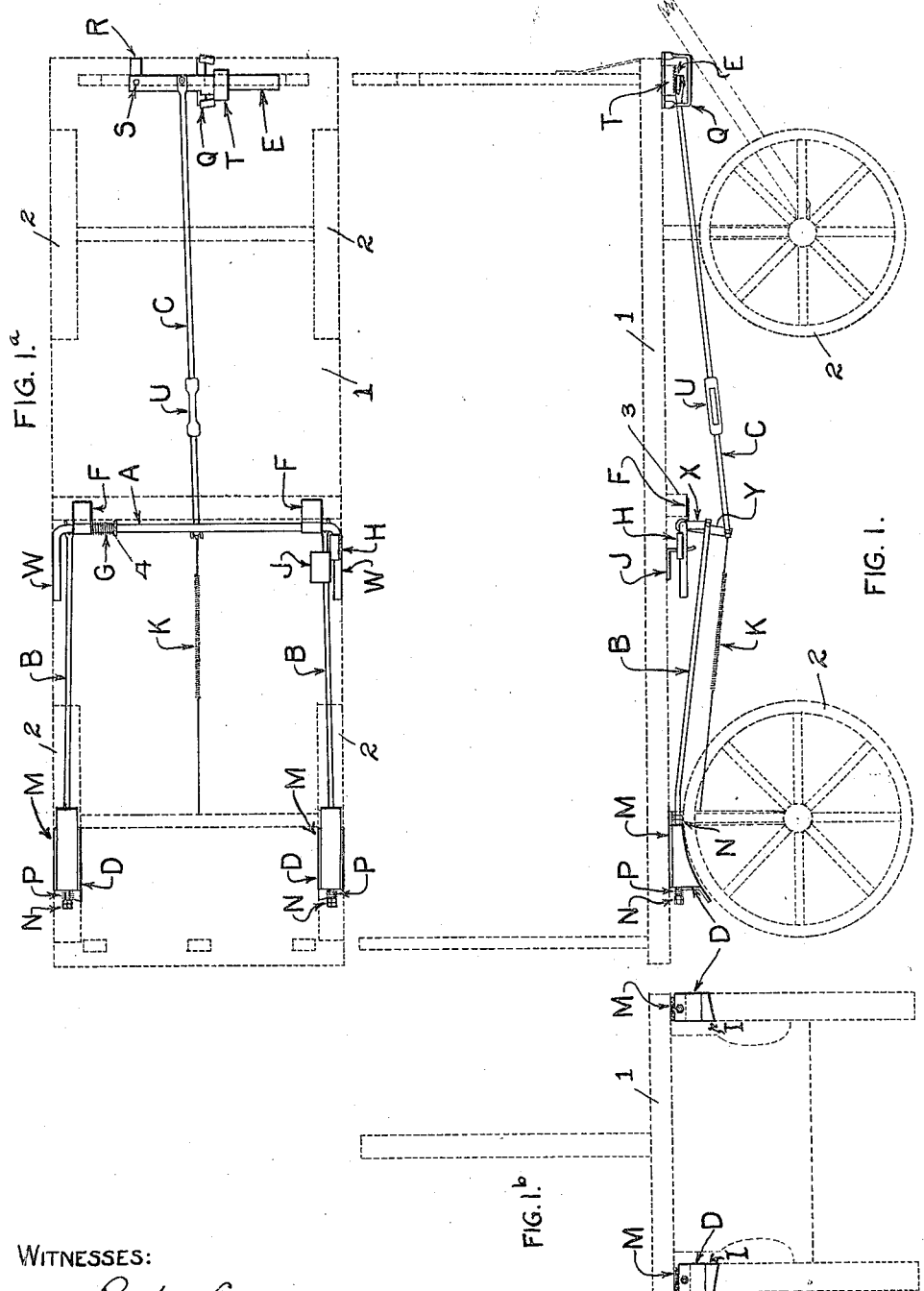
WITNESSES:
Rufus Crane
Edward J. Worline.
INVENTOR: Robert G. Knight.

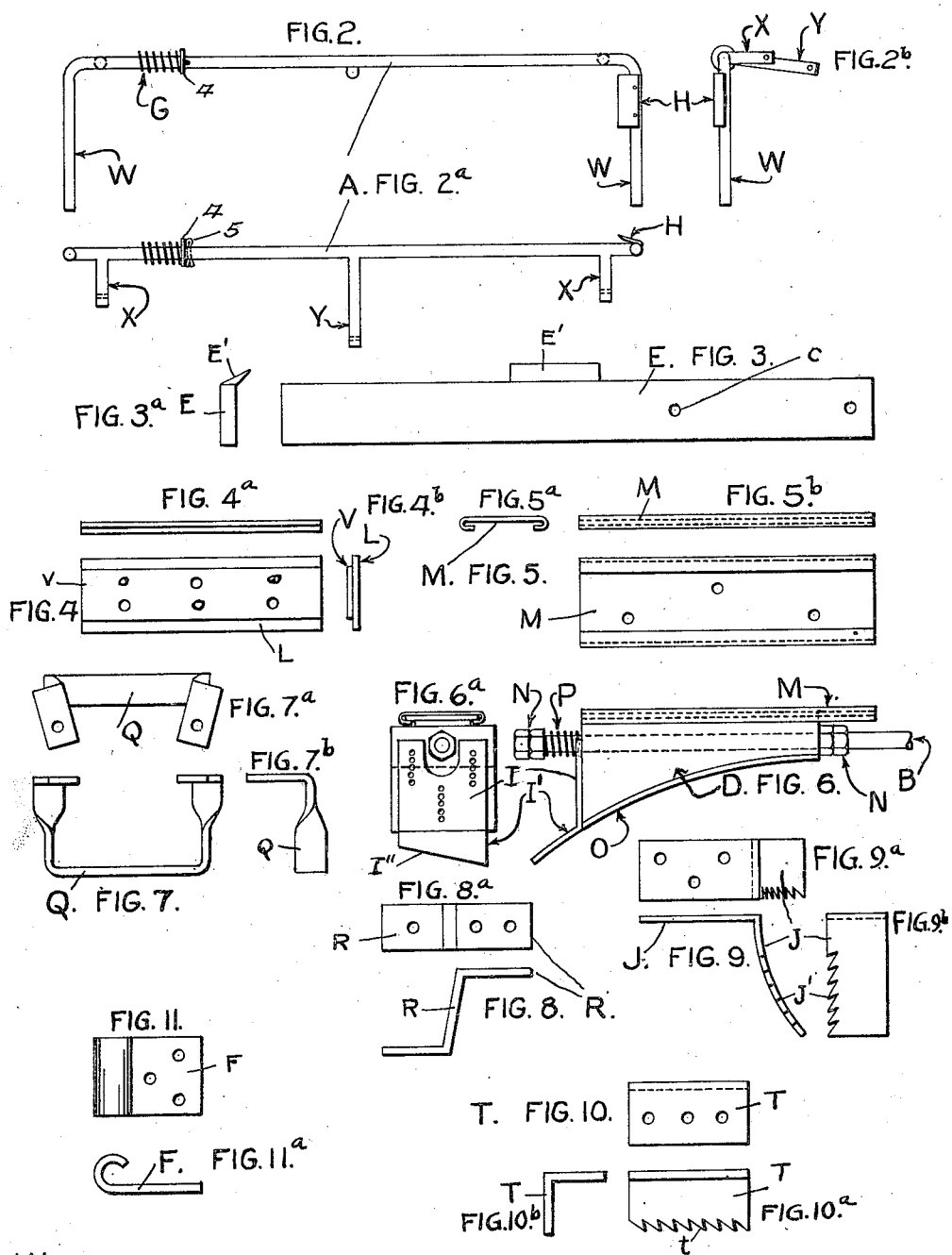

Patented June 3, 1924.

1,496,548

UNITED STATES PATENT OFFICE.

ROBERT G. KNIGHT, OF DELAWARE, OHIO.

BRAKE MECHANISM FOR DEPOT TRUCKS.

Application filed March 5, 1923. Serial No. 622,741.

*To all whom it may concern:*

Be it known that I, ROBERT G. KNIGHT, a citizen of the United States, residing at Delaware, in the county of Delaware and State of Ohio, have invented certain new and useful Improvements in Brake Mechanism for Depot Trucks, of which the following is a specification.

This invention relates to brakes particularly adapted for that type of trucks which is used at railway stations for loading and unloading mail, baggage and express matter.

An object of the invention is to provide a brake mechanism by which the brakes may be applied to the wheels of the truck from a plurality of different positions; a more specific object in this connection being to provide brakes which can be manipulated from either side of the floor of the truck or by a truckman from a position at the side of the truck or in front of the truck.

A further object of my invention is to provide a brake mechanism in which the brakes are capable of being set at a plurality of different points in connection with means for releasing the brakes from any one of these points.

A further object of the invention is to provide a brake mechanism of this character which will be simple in construction and effective in its operation.

In the accompanying drawings:

Fig. 1 is a side elevation of a truck showing my improved brake mechanism applied thereto.

Fig. 1$^a$ is a top plan view of the same.

Fig. 1$^b$ is a rear elevation.

Fig. 2 is a plan view of the central transverse extending rock shaft.

Fig. 2$^a$ is a front elevation of the rock shaft.

Fig. 2$^b$ is a side elevation of the rock shaft.

Fig. 3 is a top plan of the front operating lever.

Fig. 3$^a$ is an end view of the same.

Fig. 4 is a bottom plan of part of one of the brake shoe heads.

Fig. 4$^a$ is a side view of the same.

Fig. 4$^b$ is an end view.

Fig. 5 is a bottom plan of the grooved hanger which supports the brake shoe head.

Fig. 5$^a$ is an end view of the same.

Fig. 5$^b$ is a side view of the same.

Fig. 6 is a side view of one of the brake heads and its shoe and connected parts.

Fig. 6$^a$ is an end view of the same.

Fig. 7 is a side elevation of the keeper for the front operating lever.

Fig. 7$^a$ is a top plan view of the same.

Fig. 7$^b$ is an end view of the same.

Fig. 8 is an end view of the bracket to which the front operating lever is pivoted.

Fig. 8$^a$ is a top plan of the same.

Fig. 9 is a side elevation of the lock for the central rock shaft.

Fig. 9$^a$ is a top plan of the same.

Fig. 9$^b$ is a front elevation of the same.

Fig. 10 is a top plan of the lock for the front operating lever.

Fig. 10$^a$ is a side elevation of the same.

Fig. 10$^b$ is an end elevation of the same.

Fig. 11 is a top plan of one of the bearing brackets for the transverse rock shaft.

Fig. 11$^a$ is an end view of the same.

Referring to the drawings, 1 represents the platform of a truck of the character mentioned and 2 the carrying wheels thereof. Secured to the central cross piece 3 of the platform is a pair of brackets F curled to form bearings as shown in Fig. 11 in which bearings is journaled, a rock shaft A having its ends bent at right-angles to form operating handles W. A spring G is coiled about this shaft and interposed between one of the brackets F and a collar 4 held against longitudinal movement by a cotter pin 5 (Fig. 2$^a$) so that the rock shaft is yieldingly pressed in the direction of its axis for a purpose to be explained.

E represents an operating lever which is pivotally connected with one of the horizontal portions of an S-shaped bracket R secured to the forward end of the platform 1. A keeper Q secured to the platform also acts to sustain the operating lever. This operating lever is connected to an arm Y which projects laterally and downwardly from the central portion of the rock shaft A through the medium of a rod C which has a turn-buckle U so that its length may be adjusted.

D represents a pair of brake heads one for each of the rear wheels. Each of these brake heads has secured to its upper surface by screws or other suitable fastening devices a sub-head consisting of two metallic plates L and V of different widths so that the side edges of the plate L overhang the side edges of the plate V and are received by grooves formed by bending the side edges of a metallic plate M, which plate M is secured to the under side of the platform 1; this plate M forming a hanger for the head. Each head is also preferably provided with a shoe O of asbestos or other suitable material on the contacting concave surface thereof.

Each of these heads is pivotally secured to an arm X which extends downwardly from the end of the rock shaft A by a rod B, the rear end of the rod passing loosely through the body of the head and having threaded thereon at each end of the head a pair of nuts N; a coil spring P being interposed between the rear nuts N and the rear end of the head.

A coil spring K having one end thereof connected with the arm Y and the other end to a suitable point on the under side of the platform 1, normally holds the parts in the inoperative position shown in Fig. 1.

As shown in Figs. 2, 2ª and 2ᵇ there is secured to one of the arms W a detent in the form of an angularly arranged plate H which cooperates with a series of serrations j' on the outer edge of the vertical portion j of an angularly-shaped plate J, the horizontal portion of which is secured to the under side of the platform 1. The vertical serrated portion j of this plate is formed on the arc of a circle as shown (see Fig. 9).

Secured to the under side of the platform 1 at the forward end thereof is an angularly-shaped plate T, the lower edge of the vertical portion of which is provided with a series of serrations t which extend transversely across an angularly-projecting detent E' on the operating lever E.

In Figs. 6 and 6ª there is shown a scraper for the purpose of removing snow from the wheels in order to allow the brakes to have an effective gripping action. This scraper consists of a plate I secured to the rear end of the brake head and having a rearwardly-extending portion I' which extends upon the same curve as the shoe O, with its rear edge formed on an angle as indicated at I''.

The operation of the device is as follows: If it is desired to apply the brakes from the top of the platform or at the side of the truck one of the operating levers W is depressed thereby rocking the shaft A and through the connecting rods B sliding the brake heads forwardly to bring the shoes O thereof in contact with the peripheries of the rear wheels. The operator then moves the rock shaft laterally against the tension of the spring G to cause the detent H to engage one of the serrations j. If it is desired to apply the brakes from the front of the truck this is accomplished by drawing the free end of the lever E forwardly which will apply the brakes through the medium of the rod C, rock shaft A and connections B and then moving the operating lever upwardly until the detent E thereon engages one of the serrations T. In either case the tension of the mechanism holds the detent H or E in engagement with the serrations. If, now, it is desired to release the brakes, this may be accomplished by manipulating either one of the operating arms W or the operating lever E by simply moving the same in a direction to apply additional tension upon the brakes. If the lever E is the one which has been locked, this movement, if applied at one of the arms W, for instance, serves to release the detent E' from the serrated plate T and permits the lever E to drop down upon the keeper Q whereupon the pressure being released from the handle W the brake mechanism will be restored to normal inoperative position by the spring K. Assuming that the detent H is the one which has been engaged with its cooperating serrations j', the same method is pursued to release this detent by applying additional tension upon the mechanism through the arms W or the lever E which serves to disengage the detent from the serrations j' and permit the spring G to shift the rock shaft laterally so that when pressure is relieved the brake mechanism will be restored to inoperative position by the spring K.

This arrangement enables the truckman to readily lock the wheels of the truck from either side and to as readily release the brakes either when standing on the platform of the truck or from a position at either side of the truck. He may also set and release the brakes from the front of the truck. Further, the brakes may be released from any of the points of application regardless of which one of the operating devices has been manipulated and locked to set the brakes.

Having thus described my invention, I claim:

1. In a brake mechanism of the character described, the combination, with a truck platform, of a transversely-arranged rock shaft carried by the under side of said platform, an operating handle on each end of said shaft, a brake for each rear wheel, connections between said rock shaft and said brakes, a spring for pressing said shaft in the direction of its axis in one direction, and a locking device consisting of a member on the truck platform and a member on the rock shaft arranged to be thrown into locking relation by compressing said spring.

2. In a brake mechanism of the character described, the combination with a transversely-arranged rock shaft carried by the under side of said platform at a point between its ends, a slidably mounted brake shoe, a connection between said brake shoe and said rock shaft including a spring whereby the rock shaft may be given a movement independent of said shoe, and a lock for said rock shaft together with means for releasing the lock by an additional movement of said rock shaft independently of said brake.

3. In a brake mechanism of the character described, the combination, with a truck platform, of a transversely-arranged rock shaft carried by the under side of said platform at a point between its ends, a spring arranged to press said rock shaft in the direction of its axis, an operating handle on each end of said rock shaft, a brake head, means for connecting said rock shaft with said head constructed to allow a movement of said rock shaft independent of said head, a serrated locking member carried by said platform, and a detent to cooperate with said serrated locking member carried by said rock shaft, said detent being caused to engage the serrations by moving said rock shaft against the tension of said spring and being held in engagement with said serrations by the pressure applied to said brake whereby when said rock shaft is given a movement independent of said brake, said locking members will be automatically disengaged.

4. In a brake mechanism of the character described, the combination, with a platform, of an operating device carried by said platform at a point between its ends and having means for manipulating the same from either side of the platform, a second operating device carried by said platform near the forward end thereof, brakes for the rear wheels, connections between both of said operating devices and said brakes, devices for locking either one of said operating devices, and means whereby either one of said locking devices may be released by either one of said operating devices.

5. In a brake mechanism of the character described, the combination, with a truck platform, of an operating device carried by the under side of said platform at a point between its ends and operable from either side of said platform, a second operating device carried by the under side of said platform at the forward end thereof, brakes for the rear wheels of said truck, connections between the respective operating devices and said brakes, a locking device for each operating device consisting of a serrated member carried by the platform and a detent carried by the operating device, and means incorporated in said connections whereby either one of said operating devices may be given an additional movement independent of the brakes after the brakes have been applied whereby either one of said detents may be released from its serrated locking member by an additional movement given to either one of said operating devices.

6. In a brake mechanism of the character described, the combination, with a truck platform, of a transversely-arranged rock shaft carried by the under side of said platform at a point between its ends, a spring for pressing said rock shaft in one direction of its length, a pivoted lever at the forward end of said platform, brakes for the rear wheels of said truck, connections from the lever and rock shaft to said brakes, a locking device for both the rock shaft and the lever, and means incorporated in said connections whereby an additional movement of either the rock shaft or the lever may be given independently of the brakes after the brakes have been set for the purpose of releasing either one of said locking devices.

7. In a brake mechanism of the character described, the combination, with a truck platform, of a transversely-arranged rock shaft carried by the under side of said platform at a point between its ends together with means for rocking said shaft from either side of said platform, a pivoted lever carried at the forward end of said platform, brakes for the rear wheels of said truck, connections between said rock shaft and said brakes, a connection between said lever and said rock shaft, devices for locking the rock shaft and said lever, and means whereby either one of said locking devices may be released both by the rock shaft and by the lever.

8. In a brake mechanism of the character described, the combination, with a truck platform, of a transversely-arranged rock shaft carried by the under side of said platform at a point between its ends together with means for rocking said shaft from either side of the truck, a brake shoe for each rear wheel slidably carried by the platform a rod pivotally connecting said brake head with said shaft, said rod being loosely extended through said brake head together with a spring interposed between a fixed part on said rod and the rear end of said brake head whereby the rock shaft may be given a movement additional to said brake head after the brakes have been applied, a serrated locking member carried on said platform, a detent carried by said rock shaft cooperating with the serrations of said serrated member to lock said rock shaft, and a spring operating upon said rock shaft to throw said detent out of engagement with said serrations when said rock shaft has been given a movement independent of the brake head.

In testimony whereof, I have hereunto set my hand this 3rd day of March, 1923.

ROBERT G. KNIGHT.